United States Patent [19]

Thomas

[11] Patent Number: 5,499,919

[45] Date of Patent: Mar. 19, 1996

[54] AIRCRAFT CONTROL LEVER SIMULATOR

[75] Inventor: G. Terry Thomas, Holland, Pa.

[73] Assignee: The United States of America as represented by the Secretary of the Navy, Washington, D.C.

[21] Appl. No.: 130,950

[22] Filed: Oct. 4, 1993

[51] Int. Cl.⁶ .................................................. G09B 9/08
[52] U.S. Cl. .................................................. 434/45
[58] Field of Search ............................ 434/28, 29, 45; 74/471 XY, 437 P; 273/148 B, 437

[56] References Cited

U.S. PATENT DOCUMENTS

| | | | |
|---|---|---|---|
| 2,762,234 | 9/1956 | Dodd | 74/471 XY |
| 2,984,720 | 5/1961 | Fisher | 74/471 XY |
| 3,266,523 | 8/1966 | Stevens | 74/471 XY |
| 3,323,386 | 6/1967 | Musick et al. | 74/471 XY |
| 3,517,568 | 6/1970 | Payerle | 74/471 XY |
| 3,585,319 | 6/1971 | Payerle | 74/471 XY |
| 3,731,013 | 5/1979 | Nigtengate | 273/438 X |
| 4,206,602 | 6/1980 | Watson et al. | 74/471 XY |
| 4,646,585 | 3/1987 | Strohmeyer et al. | 74/473 P X |
| 5,129,277 | 7/1992 | Lautzenhiser | 74/471 XY |
| 5,286,024 | 2/1994 | Winblad | 273/148 B |

Primary Examiner—Thomas Price
Attorney, Agent, or Firm—Susan E. Verona

[57] ABSTRACT

An aircraft throttle simulator comprises throttle levers which extend upwardly from spheres frictionally clamped between plates. The levers are constrained for movement in a pattern allowing for forward movement from an idle position to a full throttle position, a lateral shift from the full throttle position, and forward movement to an afterburner position. A linkage is provided to connect each lever to a linear transducer to provide a position signal.

18 Claims, 4 Drawing Sheets

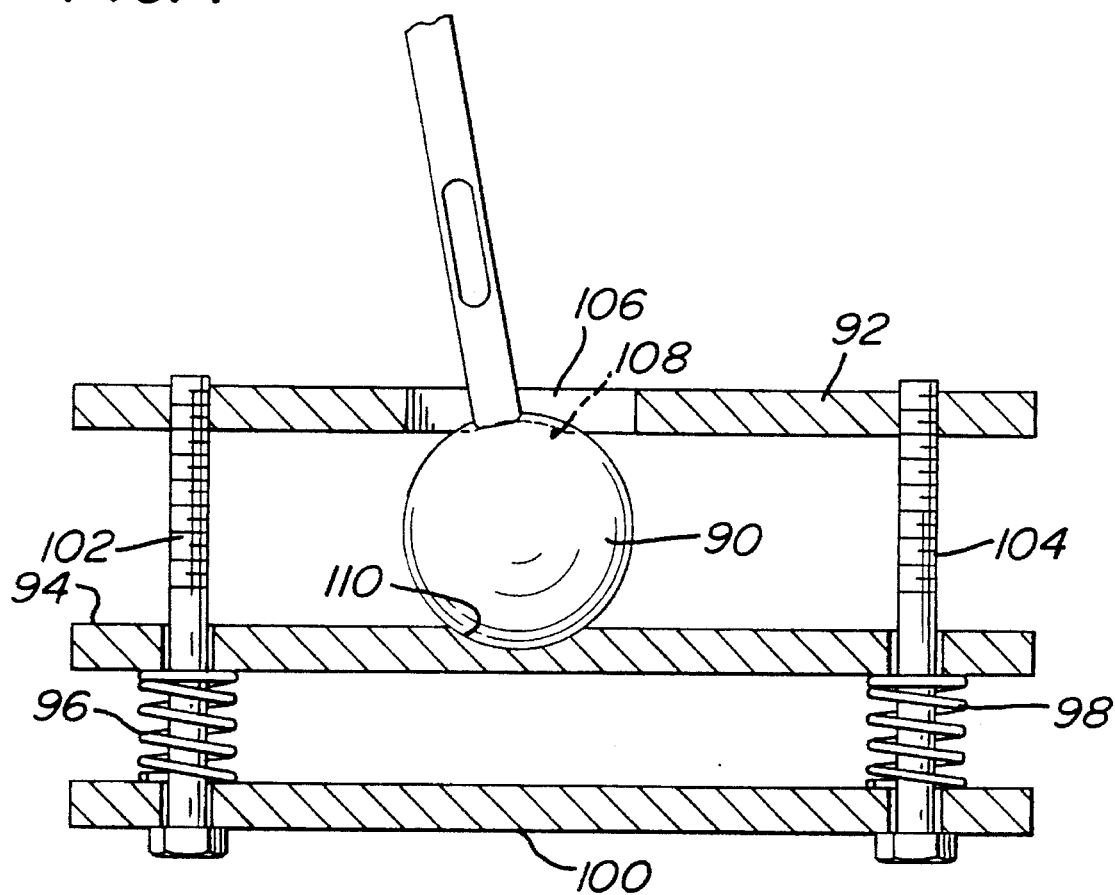

AIRCRAFT CONTROL LEVER SIMULATOR

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates generally to flight simulators for use in the evaluation of aircraft controls and displays, and for training aircraft pilots, and more particularly to the portion of the simulator which corresponds to the throttle lever or levers in an aircraft.

In a modern military jet fighter, the throttle assembly typically comprises three levers arranged side-by-side. Two of these levers are throttle levers, one for each of two engines. The third lever is a flap control. Each throttle lever is pivoted about a fixed point, and movable forward from a rearmost "idle" position to a full throttle "military" position. With the lever in the full throttle position, it can be moved laterally to the left through a distance of about ¼ inch, and then pushed further forward to activate an afterburner. The requirement for lateral movement from the full throttle position prevents accidental activation of the afterburners.

Grips on the throttle levers typically also include switches to operate the speed brake, to control wing sweep, to select radar modes, and to control weapons, and other aircraft systems, including a microphone, external lights, and a multi-function display.

In a simulator, it is desirable to reproduce, as closely as possible, the feel of the aircraft throttle lever, i.e. the resistance of the lever to movement, its apparent mass, and the smoothness of its operation. It is also necessary to provide an output signal, representing throttle position, for delivery to a computer which controls the simulator and records pilot performance. The output signal is typically a DC signal varying in the range from −10 volts to +10 volts.

Reproduction of the feel of an aircraft throttle lever is made particularly difficult by the requirement for a lateral shift to engage the afterburner. The requirement for a lateral shift and the requirement for a fixed pivot point, also make it difficult to produce a reliable throttle position signal.

SUMMARY OF THE INVENTION

The principal object of this invention is to provide a simple throttle simulator which reliably and accurately reproduces the characteristics of an aircraft throttle lever having a lateral shift for afterburner operation.

Another object of the invention is to provide a simple and reliable throttle position output signal in a throttle simulator having a lateral shift for afterburner operation.

Still another object of the invention is to provide a throttle simulator, especially a simulator having a lateral shift capability, with a simple and effective adjustment for throttle resistance.

Still another object of the invention is to provide a simple throttle simulator having multiple throttle levers having a lateral shift capability.

An elementary version of the aircraft control lever simulator in accordance with this invention comprises at least one lever having a handle at one end; a sphere fixed to the lever at a location remote from the handle and having a center and an outer surface; means for applying opposing forces to the sphere at least at two locations on the outer surface of the sphere, at least one of said forces being a frictional force resisting rotation of the sphere, but permitting rotation of the sphere by manipulation of the handle of the lever; means for constraining the lever so that its handle can be moved through a predetermined range; and a transducer, connected to the lever, for generating a lever position signal.

In a preferred version of the simulator, the opposing forces are applied by a pair of plates, consisting of an upper and a lower plate, having faces opposed to each other on opposite sides of the sphere and in frictional engagement with the sphere. Preferably, the upper plate has a slot formed in it, and the lever extends through the slot, with the handle and sphere located on opposite sides of the upper plate. The plates are clamped together by bolts, or preferably by a system of springs and bolts, and the resistance of the lever can be adjusted by tightening or loosening the bolts.

The slot in the upper plate is preferably of a size and shape such that it permits two-dimensional movement of the handle. The constraining means may take the form of a slot in a plate located above the slotted upper plate of the pair of plates clamped onto the sphere. The latter slot is shaped so that it limits movement of the lever to movement, about the center of the sphere, through a first angular range in a first plane, through a second angular range in a second plane disposed parallel to, but spaced from the first plane, and in a third plane disposed transverse to said first and second planes. The lever can be moved, in the third plane, from the first plane to the second plane. To simulate activation of the afterburner, the lever is moved forward in the first plane, then transferred to the second plane by transverse movement in the third plane, and finally moved forward in the second plane.

The transducer is preferably a linear motion transducer comprising a movable element and means constraining the movable element to movement in a straight line fixed with respect to the center of the sphere, and having a linkage connecting the movable element to the lever. In the preferred embodiment, the lever has a slot, elongated substantially in the direction of the length of the lever, and the linkage comprises a pin extending through the slot and connected to said movable element. The pin is movable in the slot in the direction of the length of the slot to permit the lever to move in a first plane about the center of the sphere, and the lever is movable, relative to the pin, in the direction of the length of the pin so that the lever is permitted to move in a plane transverse to the first plane.

Other objects, advantages and novel features of the invention will become apparent from the following detailed description of the invention when considered in conjunction with the accompanying drawings.

BRIEF DESCRIPTION OF THE DRAWINGS

FIG. 4 is a vertical section showing a modified control lever simulator in accordance with a preferred embodiment of the invention.

DESCRIPTION OF THE PREFERRED EMBODIMENTS

Figure 1:
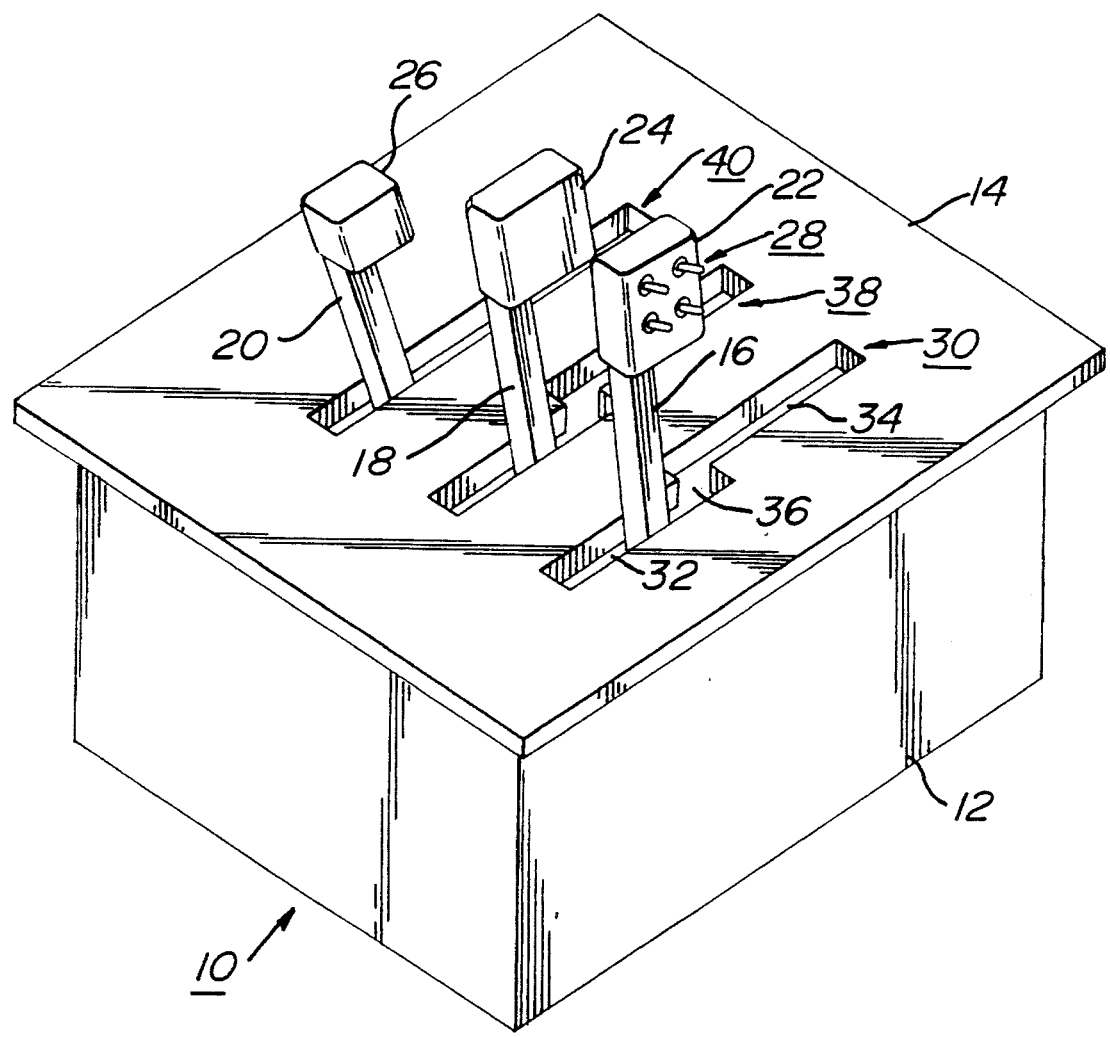
FIG. 1 is a perspective view showing the exterior of a control lever simulator in accordance with the invention, and illustrating slots for constraining throttle levers to movement in two parallel planes connected by a transverse plane.

FIG. 1 shows a simulator 10 comprising a housing 12, the top of which is a slotted plate 14. Three control levers extend upwardly through the slotted plate. A first control lever 16 simulates the throttle lever for a starboard engine on a twin engine aircraft. A second control lever 18 simulates the throttle lever for a port engine. A third lever 20 simulates a flap control. Each lever has a grip at its upper end, lever 16 having a grip 22, lever 18 having a grip 24 and lever 20 having a grip 26. The grips can be provided with electrical switches for controlling various aircraft functions such as weapons, lights, radar, etc. Switches 28 are shown on grip 22. The other grips can have similar switches (not shown).

Lever 16 extends through a slot 30 in plate 14. This slot comprises a first section 32, which extends in a fore and aft direction in a first plane, a second section 34, which extends in a fore and aft direction in a second plane parallel to, but spaced laterally from the first plane. The two sections 32 and 34 are connected by a short transverse section 36 which connects the forward end of section 32 with the aft end of section 34. Thus, sections 32 and 34 extend in opposite directions from transverse section 36. The width of slot sections 32 and 34 is only slightly greater than the width of lever 16. Similarly, the width of the transverse slot section 36 is preferably only slightly greater than the fore and aft dimension of lever 16. Accordingly, the slot 30 constrains the lever 16 to movement in a first plane, corresponding to slot section 32, a second plane, corresponding to slot section 34, and a transverse plane, corresponding to slot section 36. Movement of the lever 16 forward in slot section 32 simulates movement of a throttle lever from an idle position, at the aft end of slot section 32, to a full throttle position at the location of the transverse slot section 36. Movement of the lever 16 to the left in slot section 36 and then forward in slot section 36, simulates activation of the afterburner.

Slot 38 is similar to slot 30 in shape and function, and constrains lever 18 so that it simulates a throttle lever for a second jet engine.

Slot 40 is a straight slot which constrains flap control simulator lever 20 to fore and aft movement.

Figure 2:
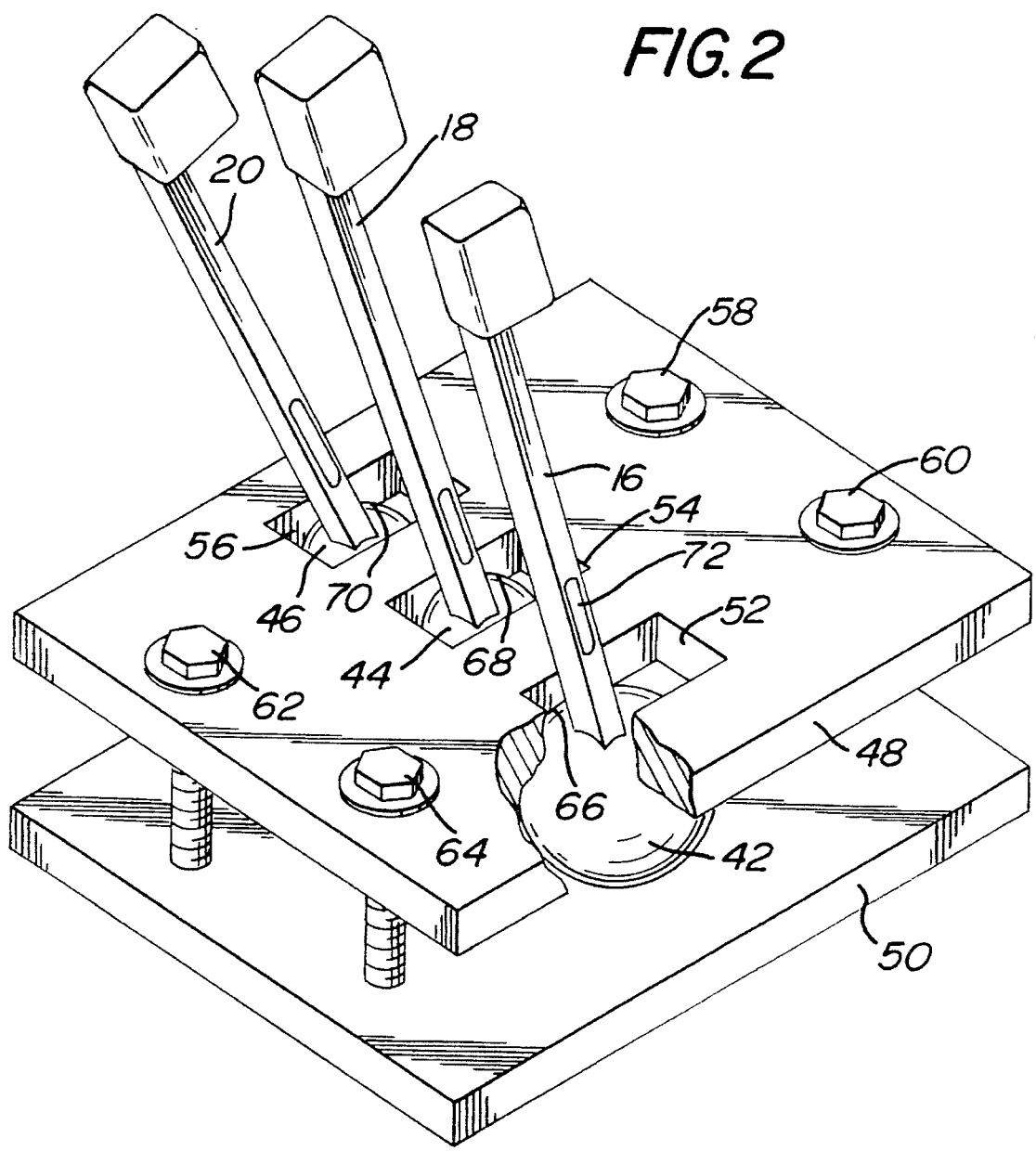
FIG. 2 is a perspective view, partially broken away, showing control levers extending upwardly from spheres clamped between two plates.

FIG. 2 shows a part of the lever support structure within housing 12. Levers 16, 18 and 20, are fixed to metal spheres 42, 44 and 46 respectively. The spheres are, in turn, located between upper and lower metal plates 48 and 50, with the levers extending through rectangular slots 52, 54 and 56, respectively, in upper plate 48. These slots are sufficiently long and wide to allow movement of each of the levers in two dimensions, i.e. not only forward and aft, but also in the port and starboard directions.

The spheres are clamped between the plates by bolts 58, 60, 62, and 64, which are threaded into lower plate 50. These bolts can be tightened or loosened to adjust the clamping forces applied by the plates to the spheres. The spheres are in frictional engagement with both plates. Accordingly, the resistance of the levers to movement can be adjusted by means of the bolts.

The centers of the spheres remain in fixed positions relative to the plates 48 and 50 by virtue of the fact that the upper parts of the spheres are received in concave, spherically shaped recesses 66, 68 and 70, formed in the underside of plate 48 at the locations of the slots. Alternatively, to insure that the centers of the spheres remain fixed, recesses can be provided in the lower plate to receive the spheres. As a further alternative, instead of rectangular slots, circular openings can be provided in the upper plate 48, preferably with bevelled edges to engage the spheres frictionally.

As seen in FIG. 2, each of the levers is provided with a slot elongated in the direction of the length of the lever. For example, lever 16 has a slot 72.

Figure 3:
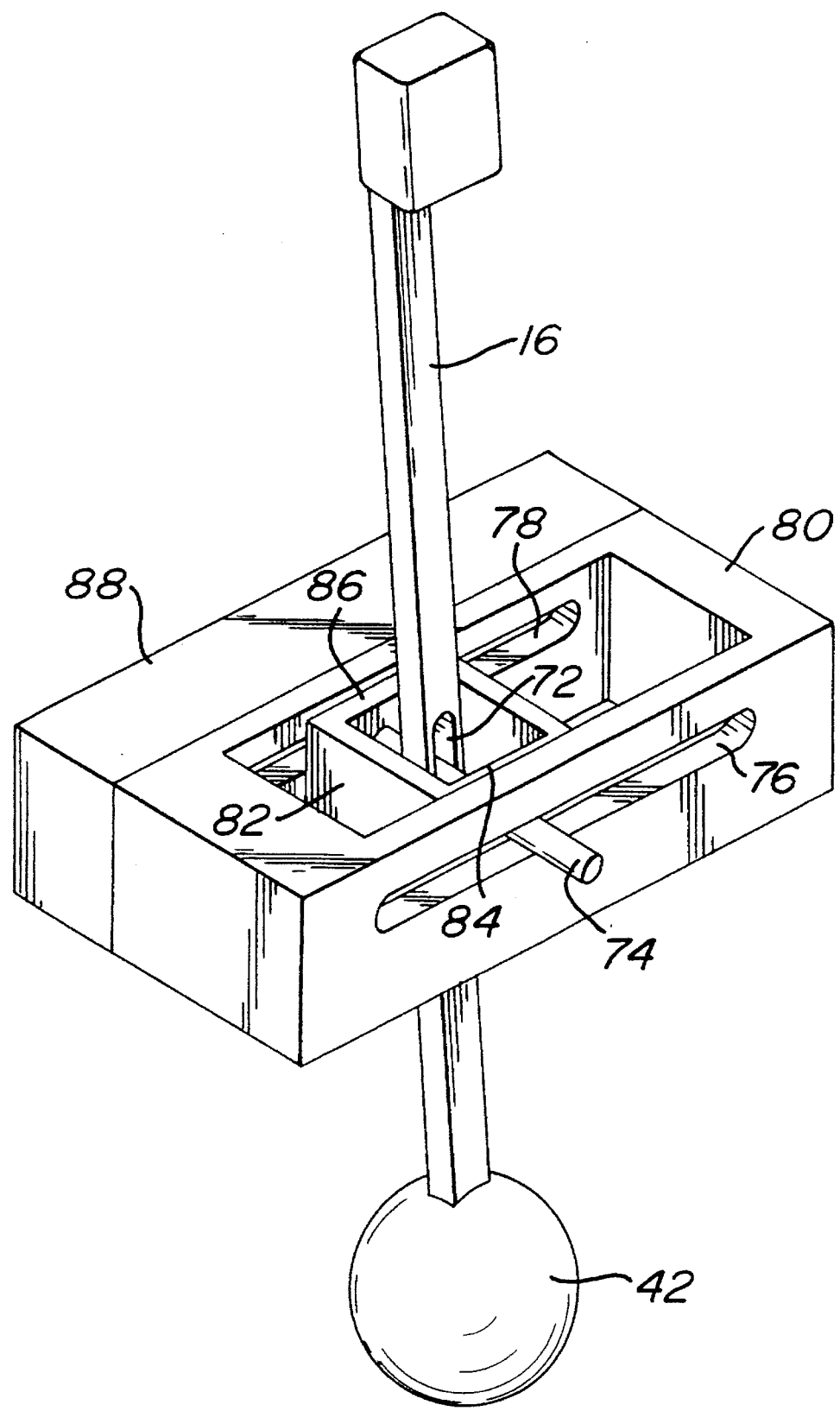
FIG. 3 is a perspective view showing a linkage for connecting a throttle lever to a linear transducer for generating a throttle position signal.

As shown in FIG. 3, slot 72 has a pin 74 extending through it horizontally. The pin is guided by horizontally elongated slots 76 and 78 provided in opposite walls of a guide block 80. The guide block is located inside housing 10 (FIG. 1), directly underneath plate 14, but above plate 48 (FIG. 2).

The horizontally elongated slots in guide block 80 maintain pin 74 in a horizontal condition at a fixed height, but allow the pin to slide fore and aft as the lever is moved fore and aft. The lever extends through a slide 82, which is movable fore and aft in the guide block 80, with its side walls 84 and 86 in sliding engagement with the side walls of the guide block. The pin 74 extends through holes in the side walls 84 and 86 of the slide and is prevented from rotating about a vertical axis. Pin 74 operates the slide or movable element (not shown) of a linear transducer 88, fixed to one side of guide block 80. The transducer is preferably a linear potentiometer, which is used to produce an electrical signal representing the fore and aft position of lever 16. The analog output signal of the potentiometer can be digitized by an analog-to-digital converter (not shown) to provide a digital signal compatible with the computer used in the simulator.

The guide block 80 can be formed from a suitable low-friction material such as PTFE to insure smooth movement of slide 82 and pin 74.

Levers 18 and 20 are provided with similar guide blocks, pins, slides and transducers.

In the operation of the device of FIG. 3, lever 16 can be moved in the path permitted by slot 30 (FIG. 1). The width of the space between side walls 84 and 86 of the slide 82 allows the lever to move laterally through slot section 36. The elongation of slot 72 in the lever allows the lever to pivot about the fixed center of sphere 42, while maintaining engagement with the pin 74. The pin 74 moves fore and aft as the lever is moved through the path permitted by slot 30, and the fore and aft position of pin 74 accurately follows the fore and aft movement of the lever. Electrical connections (not shown) to the switches in the hand grips of the levers are made through hollow spaces provided in the levers and spheres.

In the modified version of the simulator, depicted in FIG. 4, the spheres (one of which is shown at 90) are clamped between an upper plate 92 and a floating lower plate 94, which is urged by coil springs 96 and 98 toward plate 92. The coil springs are disposed between floating plate 94 and a fixed plate 100. Bolts 102 and 104 extend through plates 100 and 94 and are threaded into plate 92. The force exerted by springs 96 and 98 against plate 94 can be adjusted by turning the heads of these bolts. The bolts extend through the coil springs, and hold the springs in position on the plates. Preferably, plate 92 is provided, at the location of lever-receiving slot 106 with a recess 108 conforming to the shape of sphere 90. Plate 94 is preferably provided with a similar recess 110.

The simulator is structurally very simple and provides for smooth lever operation, and simple operation of a linear transducer by a pivoted lever which moves in a two-dimensional pattern. It reliably and accurately reproduces the characteristics of an aircraft throttle lever having a lateral shift for afterburner operation, and its lever resistance can be readily adjusted.

The device described above can be modified in a number of other ways. For example, while clamping plates 48 and 50 are preferably located respectively above and below the spheres, with the levers extending through rectangular slots in upper plate 48, it is possible to clamp the spheres frictionally between vertical plates, and to arrange the levers so that they extend outwardly between opposed edges of the respective plates rather than through slots formed in one of the plates. It is also possible to provide for frictional clamping of the spheres between elements other than slotted plates.

Many other modifications and variations of the present invention are possible in view of the above disclosure. It is therefore to be understood that, within the scope of the appended claims, the invention may be practiced otherwise than as specifically described.

I claim:

1. An aircraft control lever flight simulator comprising:
   a lever having a handle at one end;
   a sphere fixed to the lever at a location remote from the handle, said sphere having a center and an outer surface;
   a pair of plates having faces opposed to each other on opposite sides of the sphere, which apply opposing forces thereto, said forces being frictional for resisting rotation of the sphere, but permitting rotation of the sphere by manipulation of the handle of the lever;
   means for constraining the lever so that its handle can be moved through a predetermined range; and
   transducer means, connected to the lever, for generating a lever position signal.

2. An aircraft control lever simulator according to claim 1 in which one of the plates has a slot formed in it, and in which the lever extends through the slot, with the handle and sphere being located on opposite sides of said one of the plates.

3. An aircraft control lever simulator according to claim 2 including means, comprising at least one spring, for clamping said plates against the sphere so that the plates exert a clamping force on the sphere, and means, comprising a bolt, for adjusting the clamping force exerted by said clamping means.

4. An aircraft control lever simulator according to claim 2 in which said slot is of a size and shape such that it permits two-dimensional movement of the handle.

5. An aircraft control lever simulator according to claim 4 in which said constraining means limits movement of the lever to movement through a first angular range in a first plane, through a second angular range in a second plane disposed parallel to, but spaced from the first plane, and in a third plane disposed transverse to said first and second planes whereby the lever can be moved, in said third plane, from the first plane to the second plane.

6. An aircraft control lever simulator according to claim 1 in which said constraining means limits movement of the lever to movement through a first angular range in a first plane; through a second angular range in a second plane disposed parallel to, but spaced from the first plane; and in a third plane disposed transverse to said first and second planes whereby the lever can be moved, in said third plane, from the first plane to the second plane.

7. An aircraft control lever simulator according to claim 6 in which said constraining means is a plate having a slot formed therein, in which the lever extends through the slot.

8. An aircraft control lever simulator according to claim 7 in which said slot comprises a first straight portion disposed in said first plane and having two ends, a second straight portion disposed in said second plane and also having two ends, and a third portion extending in said third plane and connecting one end of said first portion with one end of the second portion to form a continuous slot, the first and second portions extending in opposite directions from the third portion.

9. An aircraft control lever simulator according to claim 1 in which the transducer means is a linear motion transducer comprising a movable element and means for guiding said movable element to movement in a straight line fixed with respect to the center of the sphere, and having linkage means connecting said movable element to said lever.

10. An aircraft control lever simulator according to claim 1 in which at least one of said plates has a concave spherical recess in the surface thereof conforming to the surface of the sphere for receiving the sphere therein.

11. An aircraft control lever flight simulator comprising:
    a lever having a handle at one end;
    a sphere fixed to the lever at a location remote from the handle, said sphere having a center and an outer surface;
    means for applying opposing forces to the sphere at least at two locations on the outer surface of the sphere, at least one of said forces being a frictional force resisting rotation of the sphere, but permitting rotation of the sphere by manipulation of the handle of the lever;
    means for constraining the lever so that its handle can be moved through a predetermined range; and
    a linear motion transducer, connected to the lever, for generating a lever position signal, said transducer comprising a movable element and means for guiding said movable element to movement in a straight line fixed with respect to the center of the sphere, and having linkage means connecting said movable element to said lever, said lever having a slot formed in it, the slot being elongated substantially in the direction of the length of the lever, and said linkage means comprising a pin extending through said slot and connected to said movable element, the pin being movable in the slot in the direction of the length of the slot to permit the lever to move in a first plane about the center of the sphere, and the lever being movable, relative to the pin, in the direction of the length of the pin whereby the lever is permitted to move in a plane transverse to said first plane.

12. An aircraft control lever flight simulator comprising:
    a lever having a handle at one end;
    a sphere fixed to the lever at a location remote from the handle, said sphere having a center and an outer surface;
    means for applying opposing forces to the sphere at least at two locations on the outer surface of the sphere, at least one of said forces being a frictional force resisting rotation of sphere, but permitting rotation of the sphere by manipulation of the handle of the lever;
    means for constraining the lever so that its handle can be moved through a first angular range in a first plane; through a second angular range in a second plane disposed parallel to, but spaced from the first plane; and in a third plane disposed transverse to said first and second planes whereby the lever can be moved, in said third plane, from the first plane to the second plane; and
    a linear motion transducer, connected to the lever, for generating a lever position signal, said transducer comprising a movable element and means for guiding said movable element to movement in a straight line fixed with respect to the center of the sphere, and having linkage means connecting said movable element to said lever, said lever having a slot formed in it, the slot being elongated substantially in the direction of the length of the lever, and said linkage means comprising a pin extending through said slot and connect to said movable element, the pin being movable in the slot in the direction of the length of the slot to permit the lever to move, about the center of the sphere, in said first and second planes, and the lever being movable, relative to the pin, in the direction of the length of the pin whereby the lever is permitted to move, about the center of the sphere, in said third plane.

13. An aircraft control lever flight simulator comprising:

a plurality of levers, each having a handle at one end and a sphere fixed to each lever at a location remote from its handle, said sphere having a center and an outer surface;

means, comprising a pair of plates having substantially planar, opposed, parallel surfaces, for applying opposing forces to said spheres at least at two locations on the outer surface of each sphere, the forces imparting resistance to the movement of said levers;

means for constraining the levers so that their handles can be moved through predetermined ranges; and transducer means, connected to each of said levers, for generating lever position signals.

14. An aircraft control lever simulator according to claim 13 including means for adjusting the forces applied to said spheres by said force-applying means.

15. An aircraft control lever simulator according to claim 14 in which said adjusting means comprises at least one bolt arranged to connect said plates.

16. An aircraft control lever simulator according to claim 13 in which one of said plates has a plurality of slots formed therein, there being one slot for each lever, and in which said levers extend through their respective slots in said plate.

17. An aircraft control lever simulator according to claim 16 in which each of said slots permits movement of the lever extending through it in two dimensions.

18. An aircraft control lever simulator according to claim 17 including an additional plate having a plurality of slots formed therein, each of said levers extending through its respective slot slot in said additional plate, and the slots in said additional plate being shaped to constrain at least two of said levers to movement in two-dimensional patterns.

* * * * *